Aug. 13, 1963 R. D. LOGAN 3,100,368
APPARATUS FOR RECOVERING COTTON FROM THE GROUND
Filed May 3, 1961 4 Sheets-Sheet 1

INVENTOR.
ROBERT D. LOGAN
BY 
ATTORNEY

Aug. 13, 1963 R. D. LOGAN 3,100,368
APPARATUS FOR RECOVERING COTTON FROM THE GROUND
Filed May 3, 1961 4 Sheets-Sheet 2

INVENTOR.
ROBERT D. LOGAN
BY
ATTORNEY

Aug. 13, 1963    R. D. LOGAN    3,100,368
APPARATUS FOR RECOVERING COTTON FROM THE GROUND
Filed May 3, 1961    4 Sheets-Sheet 3

INVENTOR.
ROBERT D. LOGAN
BY
ATTORNEY

Aug. 13, 1963 R. D. LOGAN 3,100,368
APPARATUS FOR RECOVERING COTTON FROM THE GROUND
Filed May 3, 1961 4 Sheets-Sheet 4
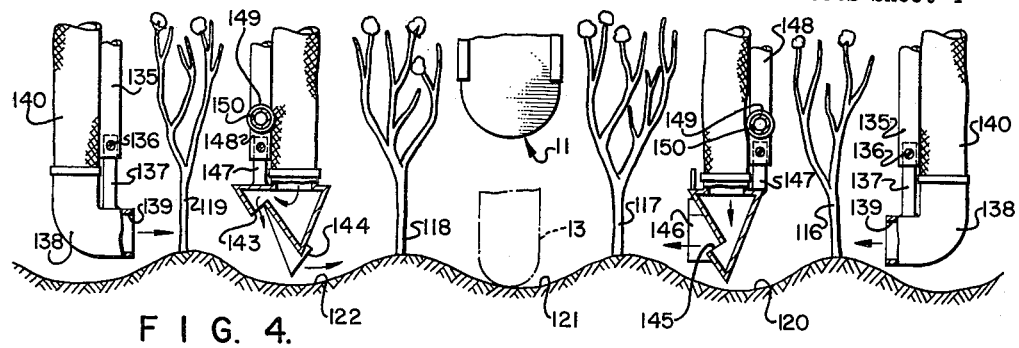
FIG. 4.
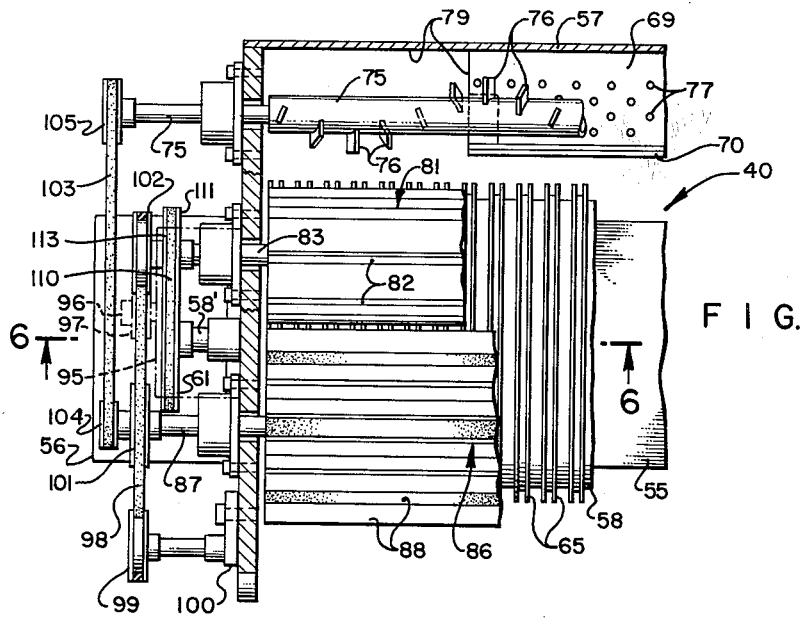
FIG. 5.
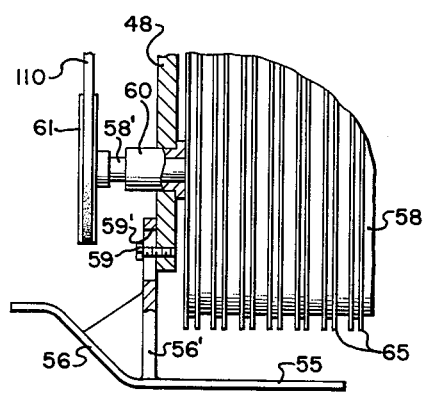
FIG. 6.
FIG. 7.
INVENTOR.
ROBERT D. LOGAN
BY
ATTORNEY United States Patent Office 3,100,368
Patented Aug. 13, 1963

3,100,368
APPARATUS FOR RECOVERING COTTON FROM THE GROUND
Robert D. Logan, Rte. 1, Box 49, Blythe, Calif.
Filed May 3, 1961, Ser. No. 107,573
27 Claims. (Cl. 56—12)

This invention relates to agricultural apparatus and more particularly to an improved mobile apparatus for use in recovering cotton lying on the ground of cotton fields and simultaneously subjecting it to salvage processing while being advanced along rows of standing cotton plants.

Following the harvesting of cotton, particularly when gathered from the plants by mechanical cotton picking equipment, it is found that valuable quantities of cotton remain scattered on the ground intermixed with leaves and broken stalks of the cotton plants. As much as ten to twenty percent of the crop may be lost in this manner.

Various proposals have been made heretofore for recovering fallen cotton but all are subject to serious disadvantages and shortcomings sought to be avoided by the present invention. The problem of gathering the fallen cotton is complicated by various factors. For example much cotton is now grown on irrigated land formed with water distributing channels or furrows extending lengthwise of the rows. Disposed to either side of these channels are crests of the earth from which rise rows of cotton plants. It will therefore be recognized that many cotton fields do not have a flat surface as might be expected of an irrigated field but, instead, is often deeply corrugated lengthwise of the rows of cotton plants. This greatly complicates the problem of designing equipment having the capability of conforming with the widely varying surface contour and effective in gathering cotton bolls lying on the ground.

Another adverse factor is based on the use of defoliating chemicals to strip the plants of leaves preliminary to picking the cotton. This greatly facilitates gathering clean cotton from the plant by mechanical picking equipment but results in the presence of considerable debris on the ground. Additionally the passage of the mechanical equipment breaks many of the dry branches from the plants thereby adding to the debris present on the ground.

Equipment previously proposed in gathering the cotton from the ground has embodied many widely differing proposals for dealing with the foregoing and other adverse factors. Certain of these devices require removal of the cotton plants as a prerequisite to the use of pickup devices for recovering the fallen cotton. Other pickup equipment is designed to operate between the rows and utilizes belts cooperating with one another to pinch the cotton between converging runs of adjacent belts. All such devices are inefficient in that they recover only a portion of the cotton present on the ground along with large quantities of debris. Additionally, all prior cotton recovery devices lack provision for separating and discarding debris which is so injurious and harmful to conventional ginning equipment that gin operators are refusing to accept such cotton for processing and cleaning.

In view of the foregoing shortcomings and inefficiencies of prior cotton recovery equipment, it is a primary object of the present invention to provide a new and improved apparatus which avoids the foregoing and other disadvantages of other prior recovery equipment.

More particularly it is an object of the present invention to provide mobile apparatus adapted to be passed over the ground of a cotton field after the main cotton crop has been harvested to recover substantially all fallen cotton and simultaneously to separate out essentially all foreign matter and retain only clean cotton.

Another object of the invention is the provision of apparatus adapted to be drawn along rows of picked cotton plants and functioning to recover fallen cotton and to pass it through a cotton and debris separator forming a unitary part of the recovery apparatus.

Another object of the invention is the provision of power driven apparatus for recovering fallen cotton from the ground of a plurality of rows of standing cotton plants and making use of air flow to sweep the cotton across the ground and between the stems of cotton plants into position for recovery by pickup means carried by the recovery apparatus.

Another object of the invention is the provision of cotton pickup apparatus utilizing streams of air for blowing the loose cotton on the ground across the ground, over furrows or other surface irregularities, through rows of cotton and into the clear space between two adjacent rows of plants from which it is picked up and delivered into collecting and processing apparatus.

Another object of the invention is the provision of mobile cotton recovery apparatus for gathering fallen cotton and thereupon separating out debris before delivering the separated cleaned cotton into a storage bin carried by the apparatus.

Another object of the invention is the provision of power drawn cotton recovery apparatus utilizing a rotary cylinder provided on its surface with teeth highly effective in picking up cotton and including moving streams of air effective in carrying the cotton into the path of the rotating teeth as the cylinder is advanced lengthwise between adjacent rows of cotton.

These and other more specific objects will appear upon reading the following specification and claims and upon considering in connection therewith the attached drawings to which they relate.

Referring now to the drawings in which a preferred embodiment of the invention is illustrated.

FIGURE 4 is a fragmentary vertical sectional view taken along line 4—4 on FIGURE 1 showing certain features of the means employed to sweep cotton across the ground and into the path of the cotton pick up assembly;

FIGURE 5 is a fragmentary sectional view taken along the broken line 5—5 on FIGURE 3 and showing details of the separator and the drive facilities therefor;

FIGURE 6 is a fragmentary vertical sectional view taken along line 6—6 on FIGURE 5 and showing details of the supporting skid for the cotton recovery assembly; and FIGURE 7 is a fragmentary sectional view on an enlarged scale through the cotton pickup cylinder showing the means for securing the toothed strips to the cylinder.

Figure 1:
FIGURE 1 is a top plan view of one preferred embodiment of the invention, parts of the apparatus being broken away to permit a clearer showing of structural details.
Figure 2:
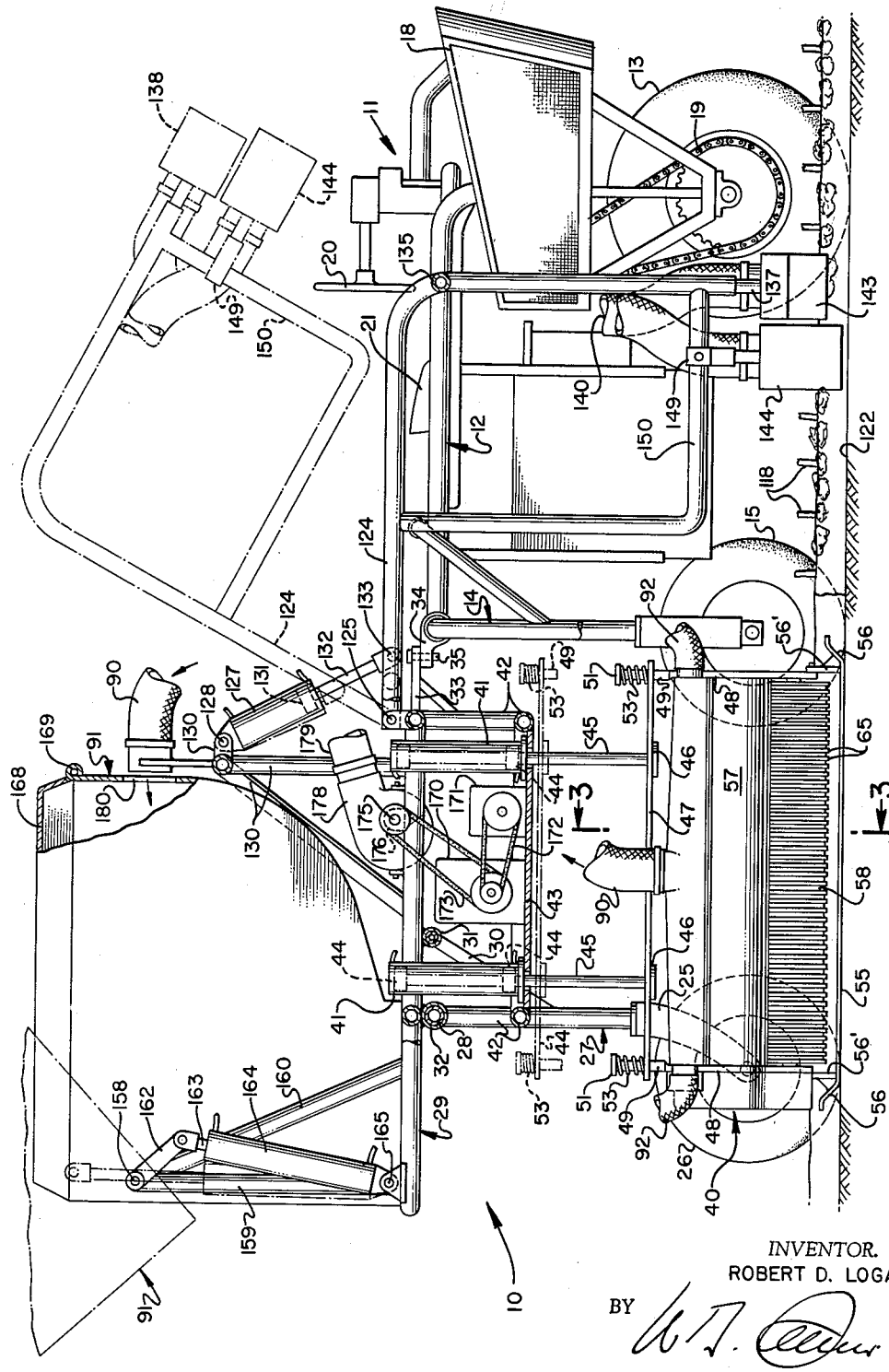
FIGURE 2 is a side elevational view of FIGURE 1 with parts broken away and with alternative operating positions of certain of the parts indicated in dot and dash line.

Referring more particularly to FIGURES 1 and 2, there is shown a preferred embodiment of cotton recovery apparatus designated generally 10 and incorporating the features of this invention. In order to make clear the line of demarcation between apparatus 10 and the tractor employed to haul it along the rows of cotton plants, the tractor will be described first, it being understood that the remainder of the apparatus forms a part of the cotton recovery apparatus as distinguished from the tractor. Thus a typical tractor designated generally 11 suitable for this purpose has a main frame 12 supported at its forward end by a single large steerable wheel 13 and having an inverted U-shaped strut 14 at its rear end straddling two rows of cotton plants. Supported within the lower ends of the legs of strut 14 are a pair of wheels 15 widely spaced from one another transversely of the tractor and positioned to track along the irrigation channel extending lengthwise of the rows.

The tractor is powered by a suitable combustion engine enclosed within housing 18 overlying forward wheel 13 and is connected to this wheel through suitable transmission means and a drive chain 19 (FIGURE 1). Wheel 13 is steered by suitable mechanism controlled through a steering wheel 20 by an operator seated on seat 21.

The remaining structure shown in FIGURES 1 and 2 comprises cotton recovery apparatus 10. This apparatus has a main frame composed of tubular members welded together and supported on wheels such as a pair of identical rear wheels 26. Wheels 26 are mounted between the legs of a castoring frame 25 having a shank at its upper end having a rotating fit within the lower ends of inverted L-shaped struts 27. The horizontal legs 28 of these struts are telescopically received within the opposite ends of a sleeve 32 secured transversely of the horizontally disposed generally rectangular main frame 29 of the cotton recovery apparatus. L-shaped diagonal braces 30 have their lower ends welded to struts 27 and the aligned horizontal legs telescopically seated within the opposite ends of a sleeve 31 secured to main frame 29 forwardly of sleeve 32 and parallel thereto. It will be understood that rear wheels 26 together with struts 27 and braces 30 are adjustable toward and away from one another axially of sleeves 31, 32 as desirable to accommodate the apparatus to different widths of the rows of cotton plants, sleeves 31, 32 being provided with through bolts or the like for locking the struts in any desired adjusted position.

Projecting forwardly of the forward end of main frame 29 are a pair of draw bars 33, 33 held detachably coupled to draw bar members 34 of the tractor, as by pins 35. It will be understood that main frame 29 as well as draw bars 33, 34 is located in a plane substantially even with or above the tops of the cotton plants.

Figure 3:
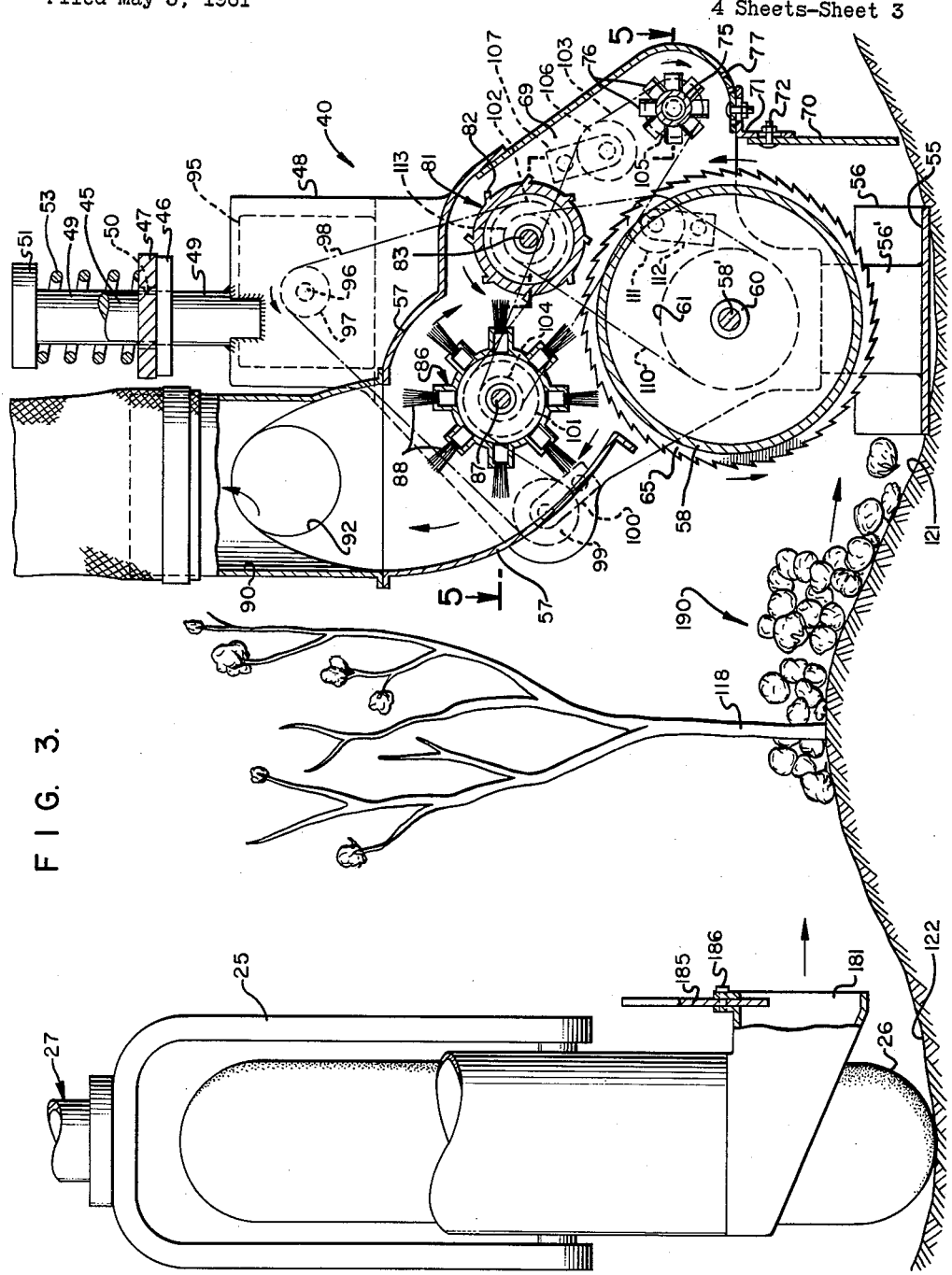
FIGURE 3 is a fragmentary cross sectional view on an enlarged scale through the combined cotton pickup and debris separator assembly taken along line 3—3 on FIGURE 2.

Carried centrally and longitudinally of the main frame 27, 29 of apparatus 10 is a cotton pickup and separator assembly designated generally 40 (FIGURES 2 and 3). This assembly comprises an elongated casing suspended from main frame 29 through power actuated means by which the assembly may be raised and lowered as, for example, by a pair of hydraulic cylinders 41, 41. These cylinders are supported in an upright position by framework 42 depending from frame 29 and having a horizontally disposed platform 43 to which the bottoms of cylinders 41 are secured in any suitable manner. Cylinder 41 houses a piston 44 secured to a piston rod 45 the lower headed end 46 of which underlies an elongated rigid member 47 overlying and extending lengthwise of assembly 40. The rigid end frames 48 of the latter assembly have shafts 49 which project vertically through openings 50 in rigid member 47. Interposed between the topside of member 47 and the capped upper ends 51 of shafts 49 is a pair of stiff coil springs 53. When assembly 40 is in its lowered operating position part of its weight is supported by springs 53 and the remainder by a rigid shoe or skid 55 which rests on the ground. The opposite ends 56 of shoe 55 are inclined upwardly and opposite to one another and aid in guiding the assembly over changes in ground contour, as will be readily understood from a consideration of FIGURES 2 and 3. The ends of skid 55 are adjustably connected to end frames 48, 48 by brackets 56' and cap screws 59, there being a vertical slot 59' in the brackets to permit adjustment of the spacing between the skid and a toothed cotton pickup cylinder 58.

*Pickup and Separator Assembly*

The cotton pickup and separator assembly 40 will now be described with particular reference to FIGURES 2, 3 and 5. This relatively lightweight assembly will be understood as having an elongated sheet metal housing 57 extending between rigid end frames 48, 48 and open lengthwise of its lower end. Rotatably supported within the latter opening and substantially filling it is a cylinder 58 secured to a shaft 58' journaled in bearings 60 (FIGURE 6) carried by the end frames, the rear end of shaft 58' projecting beyond the bearing and having a belt pulley 61 secured thereto. Secured circumferentially of cylinder 58 in closely spaced relation are a plurality of very sharp toothed blades 65 having long sharp teeth of a design corresponding to that commonly employed in the similar cylinders of cotton gin equipment. Toothed blades 65 may be constructed in any suitable manner, such as in the channel shape best shown in FIGURES 6 and 7 and secured to cylinder 58 as by screws 67. When the teeth are directed as shown in FIGURE 3, cylinder 58 is rotated counterclockwise and is effective to delivery cotton into a separator chamber 69 located along the upper right hand quadrant of casing 57, as viewed in FIGURE 3. Projecting downwardly from the lower or entrance end of chamber 69 is a flexible guard flap 70 adjustably secured to framing member 71 by bolt 72. This flap is preferably so adjusted that its lower edge is positioned close to the ground to the right of shoe 55.

Rotatably supported lengthwise along the lower outer corner of chamber 69 is a rotary destructor member comprising a shaft 75 mounted in journals at the opposite ends of chamber 69 and provided with a helical row of blades 76. The wider faces of these blades are disposed at an acute angle relative to a transverse plane normal to shaft 75, as will be best understood by reference to FIGURE 5. Owing to this inclination of the blades, it will be evident that the blades are effective to advance cotton and particularly debris material present therein axially toward the rear end of chamber 69. Shaft 75 is driven clockwise or counter to the rotation of toothed cylinder 58. Desirably the portion of housing 57 underlying destructor shaft 75 is provided with perforations or openings 77 through which dirt and smaller particles of debris escape. When these holes are one quarter to a half inch or larger in diameter excellent results are achieved. The perforated portion of casing 57 extends the full length of separator chamber 69 except that the rear end is cut away at 79 (FIGURE 5) to provide an outlet opening of a foot or so in length through which broken stalks and the like debris still present in the chamber are discharged to the ground as it is advanced toward opening 79 by the radial blades 76.

Extending lengthwise of the upper end of separator chamber 69 in approximately the one o'clock position is an imperforate beater drum 81 provided with low height blades 82 inclined to the radius of the beater. Beater 81 is secured to a shaft 83 and is rotated counterclockwise as viewed in FIGURE 3 in closely spaced relation to the underlying portion of toothed cylinder 58. The beater cooperates with the toothed cylinder in restricting the discharge of cotton from chamber 69 until it has been freed of debris. In particular, beater 81 is highly effective in knocking stalks, leaves and other debris back into separator chamber 69 for further treatment by destructor 75. However, bolls of cotton and cotton fibers firmly impaled on the teeth remain attached to the teeth and are carried upwardly beyond beater 81. Such cotton would be carried back toward the ground were it not for the dislodging action of the cotton picker brush 86 extending lengthwise of casing 57 on shaft 87. Picker brush 86 is provided with axial rows of stiff bristles 88 and is rotated at relatively high speed clockwise. Due to the considerably higher speed of rotation of the brush relative to cylinder 58, the brush bristles are effective to disengage the cotton fibers from the teeth and to carry them upwardly in the rising air stream flowing through all parts of casing 57 and into suction air tube 90. This tube opens into the suction inlet of a fan discharging into a continuation of duct 90 to carry the cotton into a storage basket 91 (FIGURE 2) supported on the upper side of main frame 29. The movement of the cotton from the toothed cylinder and into conduit 90 is facilitated in a preferred arrangement of the invention by streams of air jetted into the opposite ends of casing 57 from ducts 92. These air jets flow toward one another lengthwise of the rows of bristles 88 and serve to levitate the cotton into outlet duct 90.

The means for rotating the several rotary components of assembly 40 will now be described by reference to FIGURES 2, 3, and 5. Supported on a bracket at the rear end frame 48 is a hydraulic motor 95 (FIGURE 3) having an output shaft 96 provided with a pulley 97 driving a V-belt 98. As is indicated by the arrow overlying pulley 97, this pulley rotates counterclockwise and the left hand run of its driving belt, as viewed in FIGURE 3, passes over an idler pulley 99 mounted on an adjustable bracket 100. The belt run then passes along the top of a pulley 101 fixed to brush shaft 87 to rotate the brush clockwise, and then passes along the underside of pulley 102 fixed to beater shaft 83 and back to motor-driven pulley 97. A second V-belt 103 passes over a small diameter pulley 104 secured to beater shaft 87 and over a second pulley 105 secured to destruction shaft 75, and then over an idler pulley 106 carried on an adjustable bracket 107. The toothed drum 58 is driven by a third belt 110 passing over pulley 61 secured to drum shaft 59, then over an idler pulley 111 supported on adjustable bracket 112, and over a small diameter pulley 113 fixed to beater shaft 83.

Each of the belts 98, 103 and 110 is individually tensionable by separate idler pulleys supported on adjustable brackets. Additionally and importantly, each of the shafts driven by these belts is mounted in journals adjustably secured to end frame members 48 by bolts and by cap screws extending through elongated openings in the journal housings thereby permitting the shafts to be shifted relative to one another to vary the relative radial spacings of the rotary components of assembly 40. In other words, tooth drum 58, destructor shaft 75, beater shaft 83, and the cotton picker brush shaft 87 can be moved toward and away from one another as found desirable and to produce the most satisfactory results under the particular operating conditions encountered in a given field of cotton. It will be understood that, if desired, other means for adjusting the journal housings relative to one another may be provided since the specific design of the adjusting means in and of itself forms no part of the present invention.

*The Cotton Sweeper Facility*

An important feature of the present invention resides in the means provided for sweeping the ground clear of cotton over a considerable area to either side of pickup assembly 40 to the end that a single pickup assembly suffices to gather fallen cotton from a plurality of rows. Essentially, this is accomplished by use of a series of air jetting nozzles arranged in echelon to either side of tractor 11 and in advance of cotton recovery apparatus 10. These nozzles are supported outrigger fashion from framework pivotally supported forwardly on main frame 29 with different ones of the nozzles extending downwardly between different rows of cotton plants and in the manner now to be described.

Suitable structure for performing the function just referred to will now be outlined in detail with particular reference to FIGURES 1, 2 and 4. This cotton sweeper equipment is arranged to sweep the ground free of cotton between three full rows of cotton including strips exterior to the two outer rows of plants. This will be best understood by reference to FIGURE 1 and 4 wherein four rows of cotton plants are indicated at 116, 117, 118, and 119 each extending lengthwise of a separate crest of ground to either side of irrigation channels 120, 121, and 122.

The cotton sweeper nozzles are carried on identical rigid outriggers 124, 124, the wider rear ends of which are pivotally connected by pins 125 to brackets 126 (FIGURE 1) projecting upwardly from the forward end of main frame 29. Outriggers 124 are movable between the operating position shown in full lines in FIGURE 2 and a non-operating fully retracted position shown in dot-and-dash lines in the same figure by means of hydraulic cylinders 127. The upper end of each cylinder is pivotally connected at 128 to a rigid bracket 130 secured to the main framework 29. A piston 131 in each cylinder has a rod 132 extending beyond the lower end of the cylinder and pivotally connected at 133 to outrigger frame 124.

As is best shown in FIGURES 1 and 4 the two pivoting frames 124, 124 are positioned to either side of tractor 11, each including an inverted L-shaped tubular member 135 having its vertical leg lying along the outer side of rows 116 and 119 respectively. Adjustably secured, as by a clamping screw 136 (FIGURE 4), in the lower ends of legs 135 is a bracket 137 secured to an air nozzle 138 having its discharge end 139 positioned to sweep the cotton inwardly toward the tractor from the far side of rows 116 and 119. Nozzles 138 are supplied with pressurized air through flexible ducts 140 from blowers to be described presently. Nozzles 139 function to sweep the cotton from the far side of rows 116, 119 inwardly into the adjacent furrows and toward rows 117, 118 whereupon similar jets of air issuing from other nozzles provide supplemental and further sweeping action. For example, and as is shown in FIGURES 1 and 4, nozzles 143 and 145 are suspended adjustably from brackets 147 secured to the lower ends of tubular members 148 of frames 124. Supplementing these are nozzles 144 and 146 each of which has a ring type supporting bracket 149 slidable along horizontal tubular member 150 forming part of frame 124. It will be understood that the outlet ports of the several air nozzles are designed and arranged to direct jets and broad streams of rapidly flowing air crosswise of the surfaces of the irrigation channels and across the crests of the rows of cotton plants into channel 121 in the path of advance of the cotton pickup and recovery assembly 40. As is best shown in FIGURE 4, the outlet ports of the several nozzles differ from one another in cross sectional area and in the relative directions of the jets of air issuing from the nozzles depending upon operating conditions, the air pressure being employed, the depth of the irrigation channels and other variable operating factors, and in the manner found most effective in sweeping the ground clear of cotton. It is also to be understood that the nozzles may have their axes lying at an angle varying between 90 degrees and an acute angle relative to the path of advance of the described apparatus, the angle employed being that found most effective in sweeping the cotton into recovery assembly 40.

In the particular arrangement of the cotton sweeper nozzles shown in FIGURE 1, it is desirable that the cotton from the left-hand side of the machine, as viewed in the direction of advance, be swept farther than that from the right. To this end additional nozzles 153, 154 (FIGURE 1) are mounted on bracket 150 by adjustable supports similar to bracket 149 and are directed to sweep the cotton progressively across the ground, through row 117, and into the path of advance of pickup assembly 40.

With particular reference to FIGURES 1 and 2, it will be understood that the cleaned cotton is delivered into a temporary storage bin or basket 91 the upper rear corner of which has a pivoting hinge connection 158 with a pair of upstanding struts 159 secured to main frame 29 along the opposite sides of the bin. Strut 159 is reinforced by one or more braces 160. Fixed to one or both ends of hinge shaft 158 is a crank 162 the outer end of which is pivotally connected to the upper end of a piston rod 163 operating in a hydraulic cylinder 164 having a pivot connection 165 with the main frame. It will be understood that a similar cylinder 164 is provided on the other side of bin 91, the described cylinders being operable to pivot the bin counterclockwise about shaft 158 to dump its contents. The top of the bin is normally closed by a cover 168 hinged to the upper forward edge of the bin by hinge means 169. When bin 91 is in the position shown, cover 169 is closed but swings open automatically as the bin is tilted rearwardly sufficiently to dump its contents.

Power means for operating the air nozzles and pick-up assembly 40 is provided basically by an internal combustion engine 170 secured to platform 43 overlying assembly 40. This engine drives a hydraulic pump 171 by belt 172. A second belt 173 connects the engine to a shaft 175 extending crosswise of the main frame and supported in journal boxes 176 secured to main frame 29. Driven by shaft 175 are a plurality of air blowers each discharging, preferably but not necessarily, into separate flexible ducts leading to the various air nozzles and to casing 57 of assembly 40. Blowers 178 may be of any suitable character each having an axial air inlet and a tangential air outlet. One of the blowers has its air inlet connected with the lower end of flexible duct 90 opening into the top of pick-up assembly casing 57. The discharge of this blower opens into an upper section of duct 90 discharging into bin 91 through an opening 180 (FIGURE 2). Opening 180 is in registry with but disconnected from the end of duct 90 in order that the basket may be free to pivot to its emptying position.

It will also be understood that separate flexible ducts 179 extend from other of the blowers to each of the air sweeping nozzles 139, 143, 144, 145, 146, 153, 154 and 181. Additionally, a pair of flexible ducts 92 extend from the blowers into the opposite ends of the cotton recovery assembly 40 (FIGURE 2). Also one of the blowers supplies air to the important sweeper nozzle 181 shown in dotted lines in FIGURE 1 and located opposite the left-hand side of recovery assembly 40. The purpose of this nozzle is to deliver the cotton into assembly 40 in the manner illustrated in detail in FIGURE 3. Thus, the cotton is blown into contact with the teeth of the counterclockwise rotating cylinder 58 and is carried upwardly into receiving chamber 69. The flexible guard flap 70 cooperates and safeguards against the cotton being discharged from the right of assembly 40.

Although the full constructional details are not shown, it will be understood that hydraulic pump 171 has an inlet connected to a fluid reservoir (not shown) and an outlet pipe leading to control valves (likewise not shown) accessible to the operator and by which he can admit pressurized fluid to the described hydraulic cylinders as well as to hydraulic motor 95 for driving the cotton recovery assembly 40. The hydraulic system also includes an overflow or pressure relief valve in the high pressure line operable automatically to return excess fluid to the reservoir.

The fluid control valves include separate valves for the motor as well as for cylinders 41, 41 employed to raise and lower the cotton recovery assembly 40; cylinders 127 for lowering, raising and controlling the operating height of outrigger frames 124, 124 carrying the cotton sweeping nozzles; and cylinders 164 employed to dump the cotton bin 91. The valves controlling the flow of fluid to cylinders 41 and 127 include means for blocking both the fluid supply and outlet to the opposite ends of these cylinders in order that the fluid thereby locked within the cylinders serves to lock the air sweep nozzles as well as the cotton recovery unit selectively and positively at any desired operating height. Alternatively, and if desired, these valves may be left open and other stop means employed to control the minimum height positions of the air sweep nozzles and of the recovery unit.

*Operation*

Before placing the described cotton recovery apparatus in use, the various sweeper nozzles mounted on the pivoting frames 124 would normally be retracted, as is indicated in dot-and-dash line showing of these frames in FIGURE 2, the frames being held in this position by cylinders 127. Also at this time, cotton recovery assembly 40 would be held retracted as is indicated by fragmentary dot-and-dash showing of this unit in FIGURE 2, the assembly being held in this position by cylinders 41.

To place the apparatus in operation, the operator would advance the tractor into one end of rows of cotton, and to the position illustrated in FIGURE 1. Engine 170 being in operation, blowers 178 are effective to supply air to the various nozzles. Also the engine would be driving hydraulic pump 171 thereby to provide an adequate quantity of pressurized fluid to actuate motor 95 driving the cotton recovery assembly and to operate the various hydraulic cylinders when and as need arises.

Apparatus 10 being aligned with the rows to be swept, the operator lowers frames 124 by extension of cylinders 127 and until the air nozzles are at the proper operating height to sweep the ground between the remote sides of rows of cotton 116 to 119 free of cotton. The valves controlling cylinders 127 are then in closed position trapping the fluid in cylinders 127 to lock the nozzles firmly in the desired adjusted position. The operator then extends cylinders 41 to lower the cotton recovery assembly into channel 121 with skid 55 of this assembly resting on the ground in the position illustrated in FIGURES 2 and 3. A portion of the weight of the unit preferably remains supported by springs 53 surrounding extensions 49 projecting upwardly from end frames 48 of assembly 40.

It will be understood that each of the air nozzles may be provided with control means, such as an adjustable valve member 185 (FIGURE 3), lockable in any desired adjusted position, as by a locking screw 186. While not so shown, it will be understood that means supporting the air nozzles may be provided with means for adjusting the angularity of these nozzles to adjust the angularity of the air discharging from these nozzles relative to the surface of the ground and as desired for the most effective results in sweeping the cotton crosswise of the irrigating channels and between the stalks of the cotton plants.

Motor 95 suffices to drive all components of assembly 40 including toothed drum 58, destructor shaft 75, beater 81, and brush 86 at relative speeds appropriate for the most efficient and effective operation of each of these components. Toothed drum 58 operates at the slowest speed, a speed of 50 to 75 r.p.m. providing very satisfactory results. The remaining shafts for destructor 75, beater 81 and brush 86 rotate at considerably higher speeds as, for example 200 to 450 r.p.m. for the destructor, 150 to 250 r.p.m. for beater 81, and 200 to 450 r.p.m. for brush 86. However, it will be understood that these speeds are not particularly critical and may be varied to suit prevailing operating conditions over a considerable range simply by varying the relative diameters of the driving pulleys.

With the blowers and hydraulic motor 95 in operation, the operator engages the drive for tractor 11 and proceeds down the field. The air issuing from the several nozzles along either side of the tractor function to sweep the ground clear of cotton causing it to flow inwardly from either side of the tractor, across the irrigation channels and between the plant stalks as is indicated by the arrows in FIGURE 1. All cotton is then channeled into a windrow disposed to one side of irrigation channel 121 down which recovery assembly 40 is advancing.

Since the windrow of cotton 190 (FIGURES 1 and 3) lies on the left-hand side of row 118 of cotton plants and generally along the righthand side of the irrigation channel 121 as viewed in FIGURE 1, it will be evident that rearmost nozzle 181 (FIGURES 1 and 3) is effected to sweep the cotton into toothed cylinder 58. Guard flap 70 on the opposite side of this cylinder prevents the cotton from being blown transversely beneath and past assembly 40 and this result is further assured by the suction air flowing upwardly about either side of the toothed drum and into the interior of housing 57.

The major portion of the cotton enters the forward end of receiving chamber 69 and the great bulk of it is lifted off the teeth by blades 76 of the counter-rotating debris destructor 75. Some cotton and particularly stalks and other debris being carried upwardly through chamber 69 by the toothed drum 58 is detached by the counter-rotating action of blades 82 and by beater 81. Other cotton substantially free of stalks remaining attached and impaled on the teeth advanced counter-clockwise past beater 81 and is removed from the teeth by the rapidly rotating bristles of brush 86. This cotton is delivered into the suction air stream flowing upwardly through casing 57 from the inlet opening and carried into flexible duct 90 for transport to bin 91 in the manner described above.

Stalks and the like remaining in receiving chamber 69 are repeatedly thrown against the side walls of this chamber against the saw teeth and against beater 81 with the result that they are broken into bits as they are advanced in small increments axially of destructor 75 toward outlet opening 79 of this chamber. In consequence, only cotton substantially in clean condition remains attached to the teeth for removal by brush 86 and transport to bin 91. Some of the smaller bits of foreign matter including dirt, leaves and stalks exit from receiving chamber 69 through perforations 77 in the lower portion of casing 57 underlying the destructor. The great bulk of the debris, however, is discharged free of cotton through outlet opening 79 (FIGURE 5).

When reaching the end of the row the operator may adjust the valves of the hydraulic system to elevate the outriggers 124 as well as recovery unit 40 to a safe height for negotiating a turn into the next three rows to be swept clear of cotton. Once the turn has been made the nozzles and the recovery unit are returned to their former operating positions.

While the particular apparatus for recovering cotton from the ground herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Apparatus for gathering cotton bolls from the ground comprising a main frame adapted to be moved over the ground parallel to rows of cotton plants, power-driven means carried thereon for picking up cotton bolls from the ground including air flow producing means for sweeping the ground substantially clear of loose cotton from at least two adjacent rows thereof and for elevating the same off the ground, said power-driven means including separator means for separating cotton from leaves, stems, and debris, and means for transferring substantially clean cotton bolls into a storage bin therefor, and means for discharging separated stems and debris to a place other than said cotton storage bin.

2. Apparatus as defined in claim 1 characterized in that said cotton boll sweeping means includes a plurality of cotton sweeping means mounted on said main frame each arranged to sweep cotton from between different rows of cotton plants and cooperating with one another to sweep cotton from between a minimum of three rows of cotton plants during a single passage of said apparatus along said rows.

3. Apparatus as defined in claim 1 characterized in that said cotton sweeping means includes separate means located in the space between different rows of cotton plants and operable to move streams of air across the ground and between the base ends of rows of cotton plants into the same furrow between two rows of cotton plants, said cotton elevating means being operatively associated with said furrow and operable to elevate cotton therefrom into said apparatus for processing by said separator means.

4. Apparatus as defined in claim 1 characterized in that said main frame is supported in part by wheel means operating in the furrows between different rows of cotton and including rigid means interconnecting said wheels and overlying the tops of the cotton plants whereby cotton bolls may be gathered from the ground while the rows of cotton plants remain substantially intact.

5. Apparatus as defined in claim 4 characterized in that said wheel means includes castoring connections with said main frame to facilitate turning of the apparatus in a minimum of head space at the ends of rows of cotton plants.

6. Apparatus as defined in claim 4 characterized in that said main frame includes means at the draft end thereof for detachably coupling said main frame to a tractor at a plurality of laterally spaced points overlying the cotton plants.

7. Apparatus as defined in claim 4 characterized in that said separator means is located within the confines of said main frame and in a zone overlying the furrow into which said cotton bolls are swept.

8. That method of recovering bolls of cotton from the ground following harvest of the main crop from still-standing rows of cotton plants which method comprises, passing streams of air across the ground progressively from end to end of a plurality of rows of cotton from points spaced on the remote sides of the base ends of rows of cotton plants thereby to sweep cotton bolls across the ground and between said plants into the space between at least two rows of plants, elevating said bolls from between said two rows of plants into a receiving chamber therefor, and thereafter treating the gathered material to separate the cotton fibers from stalks and other debris elevated from the ground along with said bolls of cotton, and retaining the separated cotton and wasting the debris to a place of disposal.

9. That method of recovering bolls of cotton from the ground after the main crop has been harvested which method comprises, passing along a plurality of adjacent rows of cotton plants with a plurality of streams of air effective to sweep the ground between said adjacent rows and to move cotton therefrom into at least one row extending parallel to the rows of plants and located therebetween, elevating said gathered cotton from the ground into a separating chamber, and processing the elevated cotton to separate out branches, debris and the like for discharge to the ground and retaining the separated substantially clean cotton in a temporary storage bin while continuing to recover cotton from the ground and processing the same to separate foreign matter therefrom.

10. That method defined in claim 9 characterized in that the processing of said cotton to separate out debris is conducted in a continuous operation as cotton is delivered into said separating chamber.

11. That method defined in claim 10 characterized in that the processing of said cotton to separate debris comprises subjecting the cotton to rapid beating action while tossing the same into the air in said beating chamber thereby to break stalks, branches and leaves and the like debris present in the cotton into smaller pieces while advancing the cotton and broken debris along the receiving chamber and away from the point of entry into said chamber, and progressively withdrawing cotton substantially free of debris while being advanced along said receiving chamber.

12. Apparatus for recovering bolls of cotton from the ground of a cotton field having rows of standing cotton plants therein and characterized in the provision of a main housing supported for movement between adjacent rows of said cotton plants, said housing having an elongated inlet nozzle spaced closely above the ground between adjacent rows of said plants, a power-driven series of cylindrically arranged teeth mounted in said nozzle and rotating on an axis generally parallel to the ground therebeneath and effective to pick cotton from the ground in the path of said rotating teeth, means utilizing streams of air flowing about and close to said teeth to assist the latter in gathering cotton from the ground, and means inside said housing for removing cotton from said teeth and for conveying the same into receiving chamber means for said cotton.

13. Apparatus as defined in claim 12 characterized in that the axis of said rotating teeth extends generally parallel to said rows of cotton.

14. Apparatus as defined in claim 12 characterized in the provision of means for jetting streams of air toward the path of advance of said teeth from the opposite lateral sides thereof and effective to carry bolls of cotton lying on the ground into said nozzle.

15. Apparatus as defined in claim 12 characterized in the provision of skid means secured to said nozzle and serving to support the same in predetermined spaced relaton above the ground.

16. Apparatus as defined in claim 12 characterized in the provision of a wheel-supported frame for said housing, and spring means interposed between said housing and said frame for resiliently supporting the major weight of said housing and rotating teeth, said skid means being adapted to support a major portion of the remaining weight of said housing.

17. Cotton recovery apparatus for picking cotton from the ground of a cotton field while the cotton plants remain standing in parallel rows, said apparatus having a main frame located in major part above the standing cotton plants, wheel means extending downwardly therefrom to support the same, draft bar means above the cotton plants for attaching the same to a prime mover, means projecting downwardly from said main frame between two adjacent rows of cotton for picking cotton from the ground and discharging the same into an elevated receiver therefor, and means for hoisting said last mentioned means to an elevated non-operating position above the ground when not in use to pick up cotton.

18. Cotton recovery apparatus as defined in claim 17 characterized in the provision of a plurality of air jet means having discharge ends positioned between cotton rows to either side of said means for picking up cotton from the ground and forwardly thereof in the path of advance of said apparatus and effective to sweep cotton across the ground and into the path of said cotton pick up means.

19. Cotton recovery apparatus as defined in claim 18 characterized in the provision of power-driven forced air supply means mounted on said main frame generally above the cotton plants and including means for supplying air to said air jet means.

20. Cotton recovery apparatus as defined in claim 19 characterized in the provision of rigid frame means movably mounted on said main frame, said air jet means being mounted on said frame means, and power-operated means for raising and lowering said frame means between a raised non-operating position generally clear of cotton plants and a lowered operating position wherein said jet means are positioned close to the ground between rows of cotton plants.

21. Apparatus for recovering dropped cotton from the ground between standing rows of cotton plants and for simultaneously separating stalks and the like debris therefrom, said apparatus including an elevated wheel-supported main frame straddling a plurality of rows, an elongated cotton recovery unit depending from said frame with its axis extending parallel to the cotton rows and having an elongated inlet, a rotatable cylinder supported lengthwise of said inlet having a multiplicity of cotton picker teeth projecting therefrom effective to pick up cotton carried thereagainst by flowing air passing across the ground toward the path of advance of said cotton recovery unit, means for passing streams of air across the ground and between the cotton plants into said path of advance, and means for removing cotton from said teeth.

22. Apparatus as defined in claim 21 characterized in the provision of means for passing air across said teeth inside said unit to aid in detaching cotton therefrom and including means for conveying the cotton to temporary storing means therefor.

23. Apparatus as defined in claim 22 characterized in the provision of a receiving chamber within said recovery unit, and power-driven debris destructor means therein effective to break up cotton stalks into smaller pieces while advancing the same toward a debris discharge port, said destructor means also being effective in cooperation with said teeth to carry clean cotton out of said receiving chamber, and rotary means in the upper portion of said receiving chamber effective to return to said chamber debris tending to cling to cotton impaled on said rotating teeth.

24. A unitary cotton recovery unit for picking up cotton from the ground while being moved lengthwise between rows of cotton plants, said unit comprising an elongated housing open along its lower portion, a cylinder journaled lengthwise within said open portion and provided with a multiplicity of teeth for picking up cotton fibers and bolls, said housing having an elongated stalk destructor chamber extending along said cylinder, shaft mounted therein parallel to the axis of said cylinder and having projections extending therefrom with surfaces arranged at an angle to the shaft axis and effective to advance cotton and debris in small increments lengthwise of said shaft, beater drum means arranged above and rotating oppositely to said cylinder and cooperating therewith to throw stalks and debris downwardly while permitting cotton impaled on teeth of said cylinder to be carried along therewith, and rotary means driven faster than said cylinder and cooperating therewith to remove cotton from the cylinder teeth.

25. A unitary cotton recovery unit is defined in claim 24 characterized in the provision of at least one flowing stream of air located to receive cleaned cotton discharging from the teeth of said cylinder and to promote the transfer of the cotton into a storage receiver therefor.

26. A unitary cotton recovery unit as defined in claim 24 characterized in hydraulic motor means together with power transmitting means coupled therewith and with each of the defined rotary components to rotate the same in predetermined speed relationships.

27. A unitary cotton recovery unit is defined in claim 26 characterized in that said power transmitting means includes a plurality of flexible belts mounted on pulleys secured to the aforesaid rotary components, and means for adjusting the spacing between the axes of said rotary components.

References Cited in the file of this patent
UNITED STATES PATENTS

| | | |
|---|---|---|
| 2,730,855 | Thomas | Jan. 17, 1956 |
| 2,912,810 | Lense | Nov. 17, 1959 |
| 2,928,224 | Powell | Mar. 15, 1960 |